Sept. 22, 1953 P. A. WILLIAMS 2,652,592
MOLDING METHOD AND APPARATUS
Filed Sept. 10, 1949 2 Sheets-Sheet 1

INVENTOR.
Paul A. Williams,
BY
Parker, Prochnow & Farmer,
Attorneys.

Sept. 22, 1953　　　P. A. WILLIAMS　　　2,652,592
MOLDING METHOD AND APPARATUS
Filed Sept. 10, 1949　　　2 Sheets-Sheet 2

INVENTOR.
Paul A. Williams,
BY
Parker, Crehmon & Farmer,
Attorneys.

Patented Sept. 22, 1953

2,652,592

UNITED STATES PATENT OFFICE 2,652,592

MOLDING METHOD AND APPARATUS

Paul A. Williams, Snyder, N. Y., assignor to The W. & F. Manufacturing Co., Inc., Buffalo, N. Y.

Application September 10, 1949, Serial No. 114,957

8 Claims. (Cl. 18—42)

This invention relates to molding and more particularly to flush molding of hollow objects.

An object of this invention is to provide an improved, simple, practical and effective method and apparatus for molding, from molten materials, an object composed of materials having different characteristics, such as different colors.

Another object is to provide an improved method and apparatus for molding unitary objects having portions of different colors, fused or bonded together at their junction lines or surfaces; with which the object may be partially hollow and flush molded; with which the molded objects may be formed quickly, easily and inexpensively with the differently colored portions bonded together but not materially intermixed.

Another object is to provide simple and inexpensive apparatus for molding objects of different molding waxes; with which each object may be formed of a plurality of differently appearing waxes in different portions thereof, and with which it is unnecessary to remove any of the wax from the mold until the object is completed.

Other objects and advantages will be apparent from the following description of one embodiment of the invention, and the novel features will be particularly pointed out hereinafter in connection with the appended claims.

Figure 1:
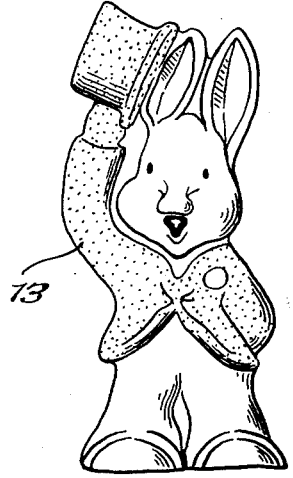
Fig. 1 is a front elevation of a small flush molded object of wax formed in accordance with this invention, in which the stippled portion is of a color different from the remainder of the object.

In the illustrated embodiment of the invention, the object selected to illustrate the molding is a toy figure of a rabbit wearing a colored jacket and holding a hat lifted from the head, which is shown in front elevation in Fig. 1. The parts shown by the stippling are of common color, such as pink or red, whereas the remainder of the object is white except for small local areas of coloring to accentuate eyes, mouth, nose, etc. Heretofore, to form such objects, the object has been cast all in one operation and all of one color, and then a pigmented coating, such as decorative paint, is applied over a portion only of the object. This requires considerable manual labor and increases the cost.

Figure 2:
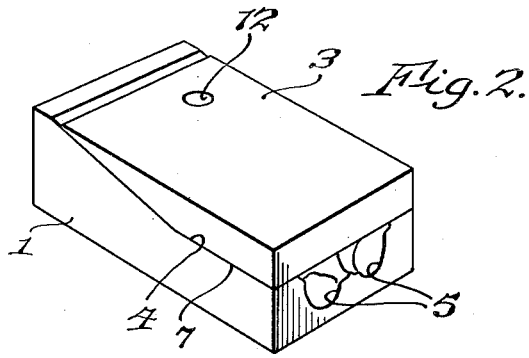
Fig. 2 is a perspective of the mold sections used in making the preliminary cast of a part of the object.
Figure 3:
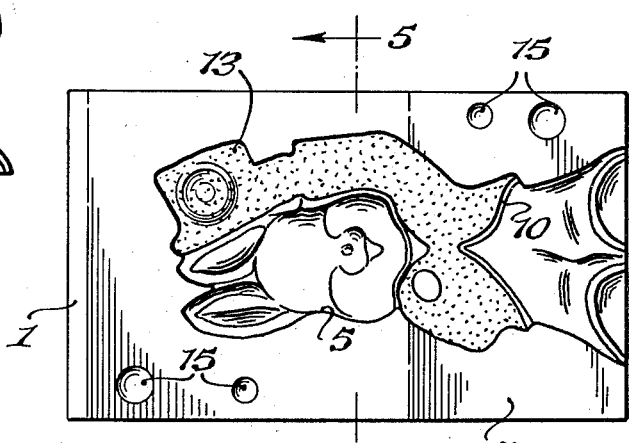
Fig. 3 is a plan of the parting face of the main mold section of this mold device, which would be the lower section in Fig. 2, after some of the wax has been poured.
Figure 5:
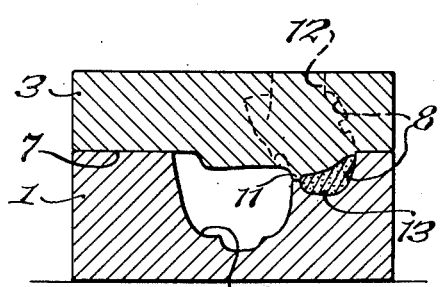
Fig. 5 is a transverse, sectional elevation through the two mold sections shown in Fig. 2, but with the section taken approximately along the line 5—5 of Fig. 3.
Figure 6:
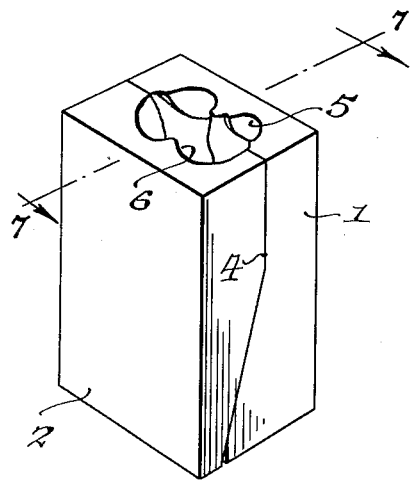
Fig. 6 is a perspective of the main mold device which includes the bottom section of Fig. 2 and a third main section with the sections in position for flush molding.

In accordance with the invention, this additional manual labor is largely eliminated and the colored part is not a mere colored surface layer but the color is homogenous throughout the part intended to be colored so that even if it is scraped or chipped, the color remains the same. The mold device employed in the practice of this invention includes a main section I, Fig. 2, and a second main section 2, Fig. 6, which are brought together face to face as shown in Fig. 6. A third or auxiliary section 3, see Fig. 2, is also employed in an intermediate step in the molding operation. The main section I is provided with a parting face 4, see Fig. 3, which has therein a cavity 5. The complementary main section 2 also has in its parting face, which is the face that abuts against the parting face 4 of section I, a cavity 6 which complements the cavity 5 in section I to represent the exterior shape of the object to be cast, such as the object in Fig. 1.

Figure 7:
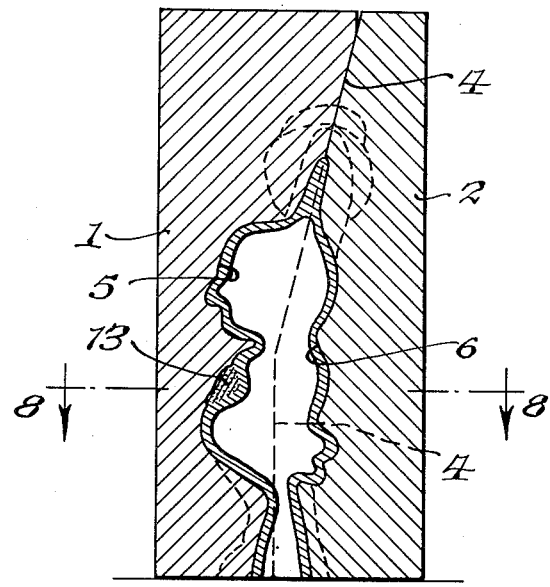
Fig. 7 is a transverse, sectional elevation of the same at the completion of a molding operation, the section being taken approximately along the line 7—7 of Fig. 6.
Figure 8:
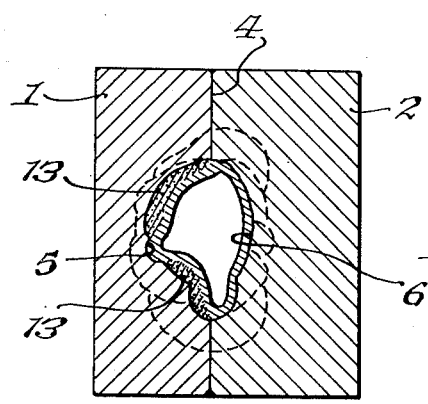
Fig. 8 is a sectional plan of the same, the section being taken approximately along the line 8—8 of Fig. 7.

The cavities 5 and 6 extend or open outwardly through an end face of the complete mold device formed of main sections I and 2, as shown in Figs. 2 and 7. The outer ends of these cavities 5 and 6 serve as a sprue or spout by which molding wax or similar material may be poured into the mold when the mold is in an upright position, such as shown in Fig. 6, and then after the wax has congealed to a desired thickness of wall, the complete mold may be inverted as shown in Fig. 7, and the uncongealed wax or molten material poured out, leaving the hollow shell within the complementary cavities 5 and 6. This is typical of flush molding of hollow objects.

Figure 4:
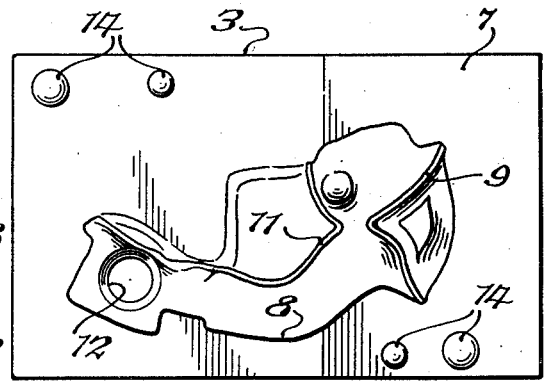
Fig. 4 is a plan of the parting face of the upper mold section in Fig. 2.

In accordance with this invention, the auxiliary section 3 is placed upon the main section I, in the manner shown in Fig. 2, so that the parting faces of the sections 1 and 3 will be abutting. The parting face 7 of the auxiliary section 3 is shown in Fig. 4, and has therein a cavity 8 which is complementary to a portion of the cavity 5 in the main section 1. The parting face 7 also has a projecting flange 9 which meets the wall of the cavity 5 and walls off a part of the cavity 5, such as would correspond to the line 10 in Fig. 3. This flange 9 fits against the wall of cavity 5 so as to place the portion of cavity 5 to the left of the line 10 out of communication with the outer end of the cavity 5. The parting face 7 of the auxiliary section 3 also has another flange 11 which extends to the bottom of the cavity 5 and follows its undulations to wall off another part of the cavity 5.

The auxiliary section 3 is provided with a sprue passage 12 from an outer face to the interior of the cavity 8 between flanges 9 and 11 so that when the mold sections 1 and 3 are assembled, as shown in Fig. 2, a quantity of one colored wax may be poured through opening 12 into cavity 9 and it will fill the complementary portions of cavities 5 and 6 between the flanges 9 and 11. This quantity of wax is allowed to congeal or set, after which the auxiliary section 3 is removed leaving the cast part 13, shown by stippling in Fig. 3, in the part of the cavity 5 in which it is cast. This part 13 is illustrated by stippling in Figs. 1, 3, 5, 7 and 8. The main section 2 is then placed in position against the main section 1, as shown in Fig. 6, it being understood that the cast portion 13 remains in the cavity 5.

Additional wax of a different color is then poured in the upper end of the mold shown in Fig. 6, and after this latter wax has congealed to a desired thickness of wall, the mold formed of sections 1 and 2 is inverted into the Fig. 7 position, to allow the uncongealed wax of the second batch to run out, leaving the hollow object between the main mold sections 1 and 2. The sections 1 and 2 may then be separated, and the object shown in Fig. 1 removed.

The second batch of wax which was poured into the mold shown in Fig. 6 has a different color or appearance from that which was poured through the opening 12 in Fig. 2, but the temperature of the second wax used in the combination mold of Fig. 6 was high enough to heat and soften the surface of the previously cast colored core 13 and bond or fuse thereto before the second batch congeals but not high enough to liquify the previously cast colored core enough to cause the two colors to mix materially. This temperature of the second wax will vary with the kind of wax used.

Different waxes have different melting temperatures and, therefore, the temperature of the second molten wax will vary with the selection of the wax. One may, if desired, use as the wax of the first batch, one which has a fusion point slightly higher than that of the second batch, so as to reduce the likelihood of the softening of the first cast wax sufficiently to run in the mold before the second wax congeals.

The parting face of the section 3 may have dowel pins 14 which are received in recesses 15 in the parting face 4 of section 1, so that the auxiliary section will always be properly positioned on the section 1, and will be held against sidewise displacement thereon during the first casting operation. The parting face of the section 2 also has similar dowel pins, not shown, that also engage in the recesses 15 of the section 1, so that the complementary cavities 5 and 6 of sections 1 and 2 respectively will always be properly positioned and held against lateral displacement while assembled. Any of the waxes used in the molding of various figures and objects, particularly those used in flush molding, may be employed. The molding sections 1, 2 and 3 are preferably of metal so as to conduct away heat from the freshly cast objects or parts thereof.

For the sake of simplicity, the mold has been illustrated as designed for the casting of objects of two different colors, but the invention also contemplates the casting of objects of more than two colors. The auxiliary section 3 may have as many dividing walls 9 and 11 as desired to isolate three or more areas, with a separate sprue passage 12 leading to each isolated chamber except to the final chamber that opens through the end pouring passage 5. Each isolated chamber into which a sprue passage 12 opens is filled, singly or simultaneously, with a differently colored, molten mass and each mass allowed to congeal, after which section 3 is replaced on section 1 by section 2, and then the last, differently colored molten mass is poured through the combined pouring passage 5—6 (Fig. 6). If the flush molding in the final chamber is not desired, that chamber is filled with molten material and allowed to completely set before the mold sections 1 and 2 are separated. By reference to different colors, I intend to include differently appearing materials such as the different primary and secondary colors, and also materially different shades of the same color, such for example as light green and dark green, or a light creamy brown and a dark brown.

It will be understood that various changes in the details, materials, and arrangements of parts, which have been herein described and illustrated in order to explain the nature of the invention, may be made by those skilled in the art within the principle and scope of the invention as expressed in the appended claims.

I claim:

1. A mold device for multi-color molding of wax objects comprising a main section and two complementary sections each formed to have a face fit and abut one face of the main section, one section at a time, said main section and one of said complementary sections having in their abutting parting faces complementary walls of a large cavity identical with the form and size of said object, said cavity terminating at one end at, and opening through, a divided face of the mold unit which is formed partly by said main section and partly by said one complementary section through which opening the fluid molding wax may be introduced into said cavity and partially removed by pouring the uncongealed portion after it has congealed to a desired thickness in the cavity, the parting face of the other complementary section forming, with the cavity of the parting face of the main section, a smaller cavity for molding a portion only of said object, said other section having a wall which abuts the parting face of the main section and enters the cavity in said main section to block off access between said opening and said smaller cavity, said other section also having a separate pouring passage solely therein and leading to said smaller cavity from an exterior face of said other section, whereby one may first cast a portion of said object by filling said smaller cavity with molten wax of one color, then replacing said other section with said one section, but leaving the cast portion within the portion of the large cavity in the main section, and then molding the balance of the object by pouring further molten wax of a different color into the large cavity through said opening.

2. A flush molding device for molding an object having parts of different colors, which comprises a two-section flush mold with a cavity in the abutting faces between the sections having the size and shape of the complete object and a molding spout leading from the cavity through an outer face of the combined sections and intersected by the line of part between the sections, and an auxiliary section that may replace one of said two sections to form a temporary mold with the other of the two sections, with the auxiliary section having wall portions engaging the cavity wall in said other of the two sections to block off and complement that portion of the cavity having the size and sape of the fractional part to be of one color, said auxiliary section having an individual sprue hole separate from said spout and leading to said portion of said cavity outside of said fractional part having the size and shape of the remaining part to be of a different color.

3. A molding device for molding an object with portions of different colors which comprises a mold formed of two separable main sections, having in the abutting faces between sections, a main cavity representing the complete object and terminating at and opening through a face formed of said main sections when abutting, through which molten wax of one color may be poured into said cavity, and an auxiliary section that may be substituted for one of said main sections in said mold and having a portion entering and engaging with the wall of a part of said cavity in the other of said main sections to form therewith a temporary mold having an auxiliary cavity between their abutting faces having the size and shape solely of that fractional part of the molded object of one of the colors, and closed from the open end of said main cavity, said auxiliary section having therein an individual sprue opening leading from one of its outer faces, separately from said open end of said main cavity, to said auxiliary cavity.

4. A molding device for molding an object with portions of different colors which comprises a mold formed of two separable main sections, having in the abutting faces between sections, a main cavity of the size and shape of the complete object, said cavity terminating at and opening through a face of said mold intersected by said abutting faces, and an auxiliary section that may be substituted for one of said main sections, said auxiliary section having, on its parting face, a wall which extends across an intermediate portion of the portion of the cavity in the other of said main sections and forms therewith a fractional cavity having the size and shape of that fractional portion of the object of one color, said auxiliary section having an individual sprue passage leading from one of its outer faces to said fractional cavity.

5. A molding device for molding a unitary object of wax with portions of different colors which comprises a mold of two separable main sections abutting along parting faces, and having between said parting faces a full cavity of the size and shape of said unitary object, and extending to and opening through one face of the mold which is intersected by both parting faces, a removable barrier fitting against the wall of a part of said cavity in one of said sections, intermediate of its margins, and creating with said cavity part a confined fractional part of the full cavity of the size and shape of that part of said object which is to be of one color, with a sprue opening leading to said fractional part, whereby said fractional part of said cavity may first be filled by pouring therein a quantity of molding wax of one color, congealing it, the barrier removed, the main sections assembled together and the balance of the full cavity filled with molding wax of the same composition but of a color different from said one color, and congealed to a desired thickness of wall.

6. A molding device for molding a unitary object of wax, with portions of different colors, which comprises a mold of two separable main sections abutting along parting faces, and having between said parting faces a full cavity of the size and shape of said unitary object and terminating at and opening through one face of the mold intersected by the parting faces, with one border of the cavity at said one face, and an auxiliary mold section which can be substituted for one of said main sections and having between its parting face and the other parting face it abuts, a recess of the size and shape of that fractional part of said full cavity remote from said one mold face which is to mold a part of said object of one color, and having a barrier wall on its parting face engageable with the cavity wall in the other of said main sections to close off said fractional part of the cavity from the balance of the cavity, in said other main section, and from the open end of the main cavity, said auxiliary section having a sprue hole leading to said fractional part of the cavity from the exterior of said auxiliary section, whereby the fractional part of said object of one color may be first cast in said fractional part of said cavity while said auxiliary section is abutting said other main section, then said auxiliary section replaced by said one main section and the balance of said object of another color then cast by the introduction of similar molten wax but of said another color into the cavity through said opening in said one face of said mold.

7. The method of forming a unitary object of molding wax with different parts thereof in different colors, which comprises completely filling by gravity a confined fractional part of a mold cavity including only a fraction of the cavity wall, but having the size and shape of that part of said object which is to be of one color, with a molten wax of one color throughout, congealing said molten wax in said mold cavity part to form a rigid fractional part of said object, then while said fractional object part remains in said cavity where cast, completely filling, by gravity, another confined mold cavity, including the unfilled part of said first mentioned mold cavity, and having the size and shape of the balance of said object, with a similar but molten molding wax of a different color and at a temperature just above its congealing temperature and which will cause it to soften and bond to the surface of said solid fractional part, but insufficient to cause substantial diffusion and mixing of the waxes of different colors before said wax of different color congeals, and then congealing said wax of different color to a desired thickness of wall.

8. A molding device for molding a unitary object of wax, with parts of different colors, which comprises a mold having therein a main cavity of the size and shape of said object, opening through and terminating at one external face of said mold, and a removable auxiliary mold section for forming with a fractional part of said cavity and a fractional part only of its wall, an auxiliary cavity of the shape and size of that portion of said object of one color, said auxiliary section being closed except having a sprue opening through which a molten wax of said one color can be poured to fill and congeal in said auxiliary cavity, whereby the main cavity with said congealed part therein can then be filled by pouring further molten wax into said opening in said one external face of the mold.

PAUL A. WILLIAMS.

References Cited in the file of this patent

UNITED STATES PATENTS

| Number | Name | Date |
|---|---|---|
| 219,557 | Woodward | Sept. 9, 1879 |
| 1,896,123 | Schweitzer | Feb. 7, 1933 |
| 2,006,666 | Bridgett | July 2, 1935 |
| 2,319,482 | Tucker | May 18, 1943 |
| 2,345,305 | Thornton | Mar. 28, 1944 |